(12) United States Patent
Millspaugh

(10) Patent No.: US 9,488,494 B2
(45) Date of Patent: Nov. 8, 2016

(54) SYSTEM AND METHOD FOR HAILING VEHICLES

(71) Applicant: Flatiron Apps LLC, New York, NY (US)

(72) Inventor: Ben Millspaugh, Greenwich, CT (US)

(73) Assignee: FLATIRON APPS LLC, New York, NY (US)

( * ) Notice: Subject to any disclaimer, the term of this patent is extended or adjusted under 35 U.S.C. 154(b) by 0 days.

(21) Appl. No.: 14/879,732

(22) Filed: Oct. 9, 2015

(65) Prior Publication Data

US 2016/0033299 A1 Feb. 4, 2016

Related U.S. Application Data

(62) Division of application No. 13/955,870, filed on Jul. 31, 2013, now Pat. No. 9,157,748.

(60) Provisional application No. 61/678,038, filed on Jul. 31, 2012.

(51) Int. Cl.
| | |
|---|---|
| *G01C 21/20* | (2006.01) |
| *G01C 21/36* | (2006.01) |
| *G08G 1/00* | (2006.01) |
| *G08G 1/127* | (2006.01) |

(52) U.S. Cl.
CPC ........... *G01C 21/3697* (2013.01); *G01C 21/20* (2013.01); *G08G 1/202* (2013.01); *G08G 1/127* (2013.01)

(58) Field of Classification Search
CPC .. G01C 21/20; G01C 21/3697; G08G 1/202; G08G 1/127
See application file for complete search history.

(56) References Cited

U.S. PATENT DOCUMENTS

| | | | |
|---|---|---|---|
| 6,456,207 | B1 | 9/2002 | Yen |
| 6,615,046 | B1 | 9/2003 | Ur |
| 6,756,913 | B1 | 6/2004 | Ayed |
| 6,958,701 | B1 | 10/2005 | Storkamp et al. |
| 7,113,864 | B2 | 9/2006 | Smith et al. |
| 7,706,808 | B1 | 4/2010 | Aggarwal et al. |
| 7,840,427 | B2 | 11/2010 | O'sullivan |
| 7,941,267 | B2 | 5/2011 | Adamczyk et al. |
| 8,005,488 | B2 | 8/2011 | Staffaroni et al. |
| 8,116,836 | B2 | 2/2012 | Ki |
| 8,126,903 | B2 | 2/2012 | Lehmann et al. |
| 8,131,307 | B2 | 3/2012 | Lubeck et al. |
| 8,160,808 | B2 | 4/2012 | Sprigg |
| 8,285,570 | B2 | 10/2012 | Meyer et al. |
| 8,386,177 | B2 | 2/2013 | Wu |
| 8,442,848 | B2 | 5/2013 | Myr |

(Continued)

FOREIGN PATENT DOCUMENTS

WO WO 2011/069170 6/2011

*Primary Examiner* — Yuen Wong
(74) *Attorney, Agent, or Firm* — Leason Ellis LLP

(57) ABSTRACT

The present application provides a system and method for enabling a driver to locate a passenger. In one or more implementations, a graphical user interface is provided that is operable to send and receive information associated with passengers and vehicles. A location of a first vehicle, a location of a first passenger and a location of a second passenger are received. Information associated with the locations of the first and second passenger is transmitted and a representation of at least one of the first passenger and the second passenger and the respective location thereof is provided.

28 Claims, 12 Drawing Sheets

(56) References Cited

U.S. PATENT DOCUMENTS

| | | |
|---|---|---|
| 8,469,153 B2 | 6/2013 | Wu |
| 8,483,939 B2 | 7/2013 | Wu |
| 8,554,608 B1 * | 10/2013 | O'Connor ............ 705/13 |
| 8,565,789 B2 | 10/2013 | Staffaroni et al. |
| 8,600,665 B2 | 12/2013 | Vander Linde et al. |
| 8,700,310 B2 | 4/2014 | Jayanthi |
| 2005/0153707 A1 | 7/2005 | Ledyard et al. |
| 2006/0034201 A1 | 2/2006 | Umeda et al. |
| 2006/0135134 A1 | 6/2006 | Mezhvinsky et al. |
| 2006/0136254 A1 | 6/2006 | Greenstein |
| 2006/0217885 A1 | 9/2006 | Crady et al. |
| 2008/0015923 A1 | 1/2008 | Masaba |
| 2009/0037194 A1 | 2/2009 | Roche |
| 2009/0156241 A1 | 6/2009 | Staffaroni et al. |
| 2009/0176508 A1 | 7/2009 | Lubeck et al. |
| 2009/0192851 A1 | 7/2009 | Bishop |
| 2009/0287527 A1 | 11/2009 | Kolb et al. |
| 2010/0216509 A1 * | 8/2010 | Riemer et al. ............ 455/557 |
| 2011/0099040 A1 | 4/2011 | Felt et al. |
| 2011/0301985 A1 | 12/2011 | Camp et al. |
| 2011/0307282 A1 | 12/2011 | Camp et al. |
| 2011/0313804 A1 | 12/2011 | Camp et al. |
| 2012/0323642 A1 | 12/2012 | Camp et al. |
| 2013/0132140 A1 | 5/2013 | Amin et al. |
| 2013/0132246 A1 | 5/2013 | Amin et al. |
| 2013/0132887 A1 | 5/2013 | Amin et al. |
| 2013/0246207 A1 | 9/2013 | Novak et al. |
| 2013/0246301 A1 | 9/2013 | Radhakrishnan et al. |
| 2014/0011522 A1 | 1/2014 | Lin et al. |
| 2014/0058896 A1 | 2/2014 | Jung |
| 2014/0067488 A1 | 3/2014 | James et al. |
| 2014/0067489 A1 | 3/2014 | James et al. |
| 2014/0067490 A1 | 3/2014 | James et al. |
| 2014/0067491 A1 | 3/2014 | James et al. |
| 2014/0074757 A1 | 3/2014 | De Gennaro et al. |
| 2014/0129135 A1 | 5/2014 | Holden et al. |
| 2014/0129302 A1 | 5/2014 | Amin et al. |
| 2014/0129951 A1 | 5/2014 | Amin et al. |

* cited by examiner

SYSTEM AND METHOD FOR HAILING VEHICLES

CROSS REFERENCE TO RELATED APPLICATION

The present application is a divisional of U.S. patent application Ser. No. 13/955,870, now U.S. Pat. No. 9,157,748, issued Oct. 13, 2015, which claims the benefit of U.S. Patent application Ser. No. 61/678,038, filed Jul. 31, 2012, which are incorporated by reference as if expressly set forth in their respective entireties herein.

FIELD

The present application relates, generally, to networking and, more particularly, to a networked system and method for locating taxicabs and prospective passengers.

BACKGROUND

Larger and/or well-funded funded companies have been zeroing in on various metropolitan areas, such as New York City as of late. GetTaxi, TaxiMagic, Hailo are the largest and most aggressive. They all have a similar app that is built around a "pre-arranged" or "dispatch" service with a mobile credit card payment feature. They are well developed and marketed apps but they cannot crack into the NYC market without substantial regulatory change and industry acceptance. The 13,250 yellow cabs in NYC are not legally allowed to be "dispatched."

To date, no one has successfully created an innovative app to help passengers find taxicabs, or drivers find passengers, in the NYC market. There is one exception called Cab Sense which suggests streets and corners people should walk to in Manhattan for the best odds of getting a cab via a GPS map. It appears to have minimum utility or adoption and yet it is the only one NYC promotes on some of their web sites as a tool because there are no others.

The means of securing a taxi ride are generally defined by two distinct methods:

1) a "dispatch" or "pre-arranged" connection of a person to a taxi driver thru various means . . . (calling a dispatch center, calling a cab driver directly, or other means such as through the use of an app through a mobile phone or a computer). The key characteristic is that a person makes a general request for a taxi and that there is a negative or affirmative acknowledgement conveyed back whether a taxi driver will accept it, and which one. This requires the sharing of information and an explicit agreement of a transaction between two parties. In such an arrangement the client will wait for the specific driver to come to him and forego other taxis that may become readily available while waiting. The taxi driver will come directly to the client, possibly bypassing other street hailing clients along the way. It is incumbent for both parties to identify each other by some means (e.g. a person looking for specific identifying markers on the taxi vehicle).

2) "hailing a taxi" is a person standing outside, typically street-side, drawing attention to any taxi on a random basis by raising their hand indicating they want to be picked up ("hailing"). According to NYC regulators, as an example, the absence of any "pre-arrangement" is defined as a "hail". Some markets like NYC are by regulation a "hail only" market. This means taxis cannot communicate with persons needing a taxi ride and pre-arrange for service. As such taxis have no central point to communicate with (a dispatch center) to relay the pick-up and deployment of passengers. In such a regulated environment they are forbidden to have any other means of pre-arranging a pick-up with a prospective client, whether through the use of physical dispatch center or through any electronic means such a Smartphone app that's designed for "pre-arranged" services (such as the companies mentioned above). Drivers in NYC are required to pick up the first or closest person they physically see "hailing" a taxi.

In areas of high density there can be efficiencies and simplicity of having taxis drive around picking of people immediately upon seeing them. This can prove to be simple and quick for passengers too. The challenge taxi drivers have is that they can only see "hailing" persons who are within their line of sight, therefore limiting their view of persons needing a taxi. Drivers have many obstructions in fulfilling the need of picking up hailing persons (e.g. large trucks in the roads, not seeing around buildings on street corners, poor weather, limited range of sight in darkness, etc). Many times a taxi driver has to randomly drive around looking for passengers. People needing a taxi often have to physically search for a taxi by walking to busy avenues.

SUMMARY OF INVENTION

The present application provides a system and method for enabling a driver to locate a passenger. In one or more implementations, a graphical user interface is provided that is operable to send and receive information associated with passengers and vehicles. A location of a first vehicle, a location of a first passenger and a location of a second passenger are received. Information associated with the locations of the first and second passenger is transmitted and a representation of at least one of the first passenger and the second passenger and the respective location thereof is provided.

These and other aspects, features, and advantages of the invention can be understood with reference to the following detailed description of certain embodiments of the invention taken together in conjunction with the accompanying drawings figures.

SUMMARY AND DESCRIPTION

Figure 1:
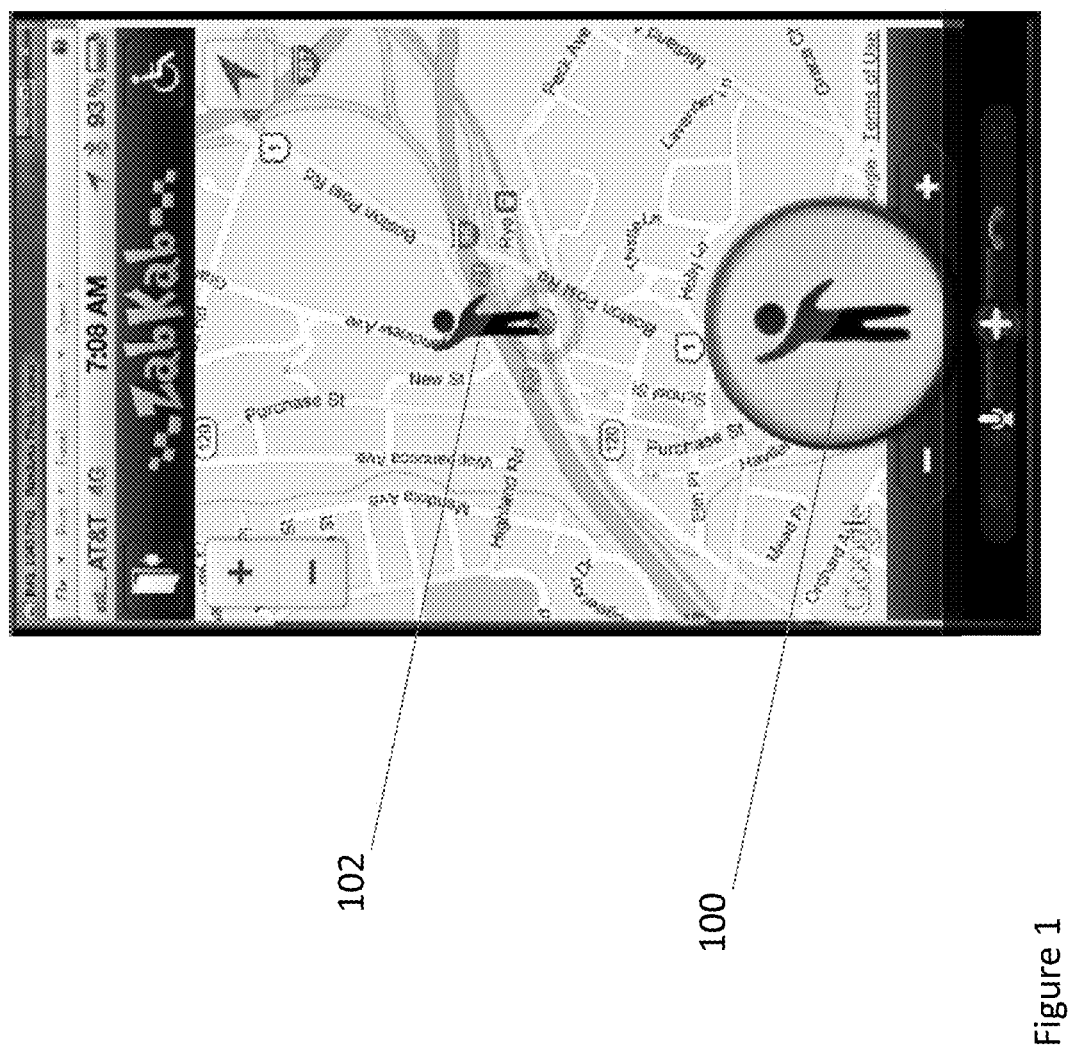
FIGS. 1-3 illustrate example mobile computing device display screens in connection with a user attempting to hail a taxicab in accordance with an embodiment.

The present application regards a system and method for efficiently assisting a taxicab driver to locate and find people seeking a taxi, and similarly for passengers to locate and find a taxicab, in accordance with an anonymous, spontaneous, hailing transaction (pick-up). In one or more implementations, the application is referred to herein, generally, and also shown in the drawings as ZAB KAB.

In an implementation, one or more software applications is provided for use on mobile computing devices, such as a Smartphone, portable digital assistant ("PDA"), tablet computer or the like, that assists drivers to find more fares, and that assists passengers to find more taxicabs. By providing a graphical user interface on a mobile computing device, taxicab drivers can see where customers are hailing, including customers who are around a corner, blocks away, and during any time day or night. In an implementation, a registered taxicab driver logs in, for example by providing authorization information (e.g., username and password), and a representation of a map and graphical icons of hailing passengers and doormen appear on the computing device's screen. This provides taxicab drivers with the exact location of people hailing for a cab, in cities, outskirts, suburbs and in the country. In an implementation, representations of taxicab drivers and/or passengers remain anonymous. Passengers do not know which cab driver is coming until the taxicab arrives, and taxicab drivers do not know which passengers are hailing until the taxicab arrives.

In an implementation, a taxicab driver downloads software for his or her mobile computing device, and registers with a central computing device, i.e. a web server computer, and configures the software according to individual preferences. For example, the taxicab driver can customize the appearance of a graphical icon of his or her taxicab as the icon appears on a passenger's computing device. The taxicab driver may configure the icon to appear as a SUV, rather than a sedan, so that prospective passengers may generally identify the taxicab as suitable or not for the passengers' needs.

In operation in accordance with an implementation, a passenger (or other person assisting a passenger, such as a doorman) presses a hail button on the display screen of a mobile computing device. This sends a signal to all cabs in the surrounding area that are operating software on their respective mobile computing devices in accordance with the present application, and alerts the drivers where the passenger wants to be picked up.

Accordingly, the present application uniquely addresses the market of hailing a taxi. Without changing how business is conducted and by maintaining the virtues of street hailing, the present application substantially improves upon the ease and efficiencies of hailing a taxi. The indication of a person hailing a cab is extended far beyond a person physically raising his or her arm. Moreover, the intention of one or more persons needing a taxi is shown on the taxi driver mobile device screens. This enables taxicab drivers to "see" far beyond mere eye sight as to where people need their services. Drivers do not need to search for passengers and passengers do not need to physically search for taxi drivers; their presence (location) to one-another may be indicated on a map. Another benefit is that passengers can stay at their point of interest in getting a taxi and wait for the nearest driver to come pick them up without having to walk to areas where taxis may have been more prone to drive (e.g. busy streets, taxi stands, etc).

In addition to the general population easily sending an "electronic hail" from their mobile device, so too can doormen and bellhops. A doorman can stop using a whistle or light on top of a door awning as an assistive means for hailing a taxi for their guests or building residents. When they tap the hail button on their mobile device, a unique "doorman icon" is presented in addition to general passenger hailing icons, on taxi driver mobile device screens.

Figure 8:
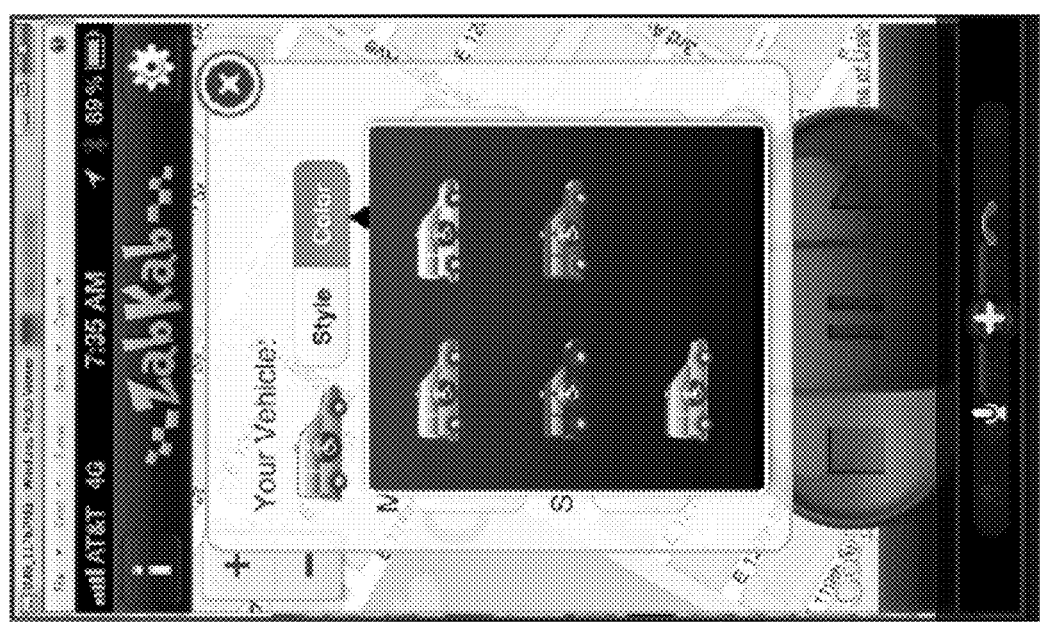
FIGS. 8-10 illustrate example customization options for taxicab drivers.
Figure 9:
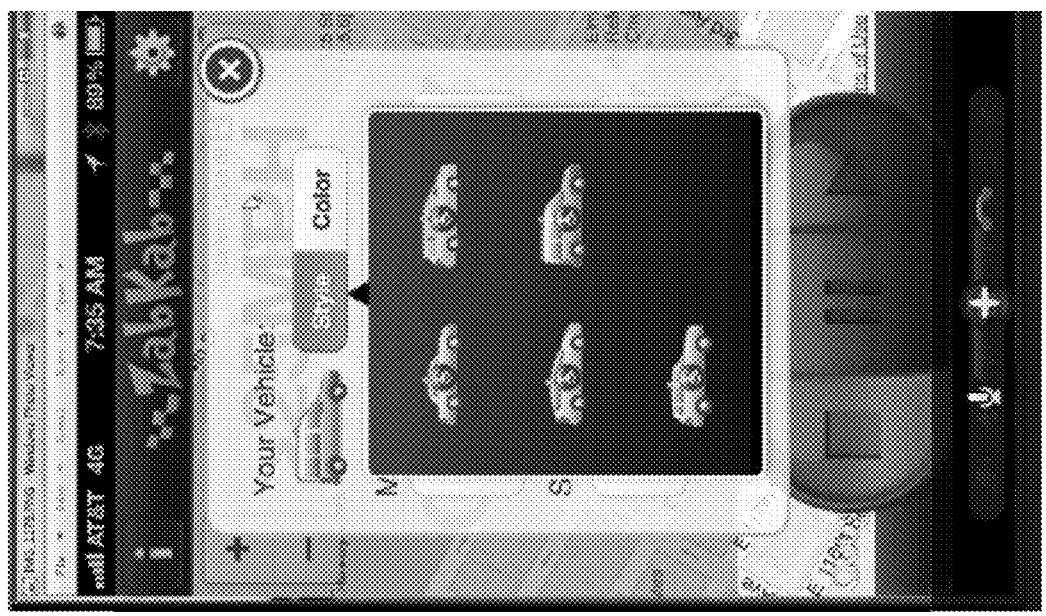
Figure 10:
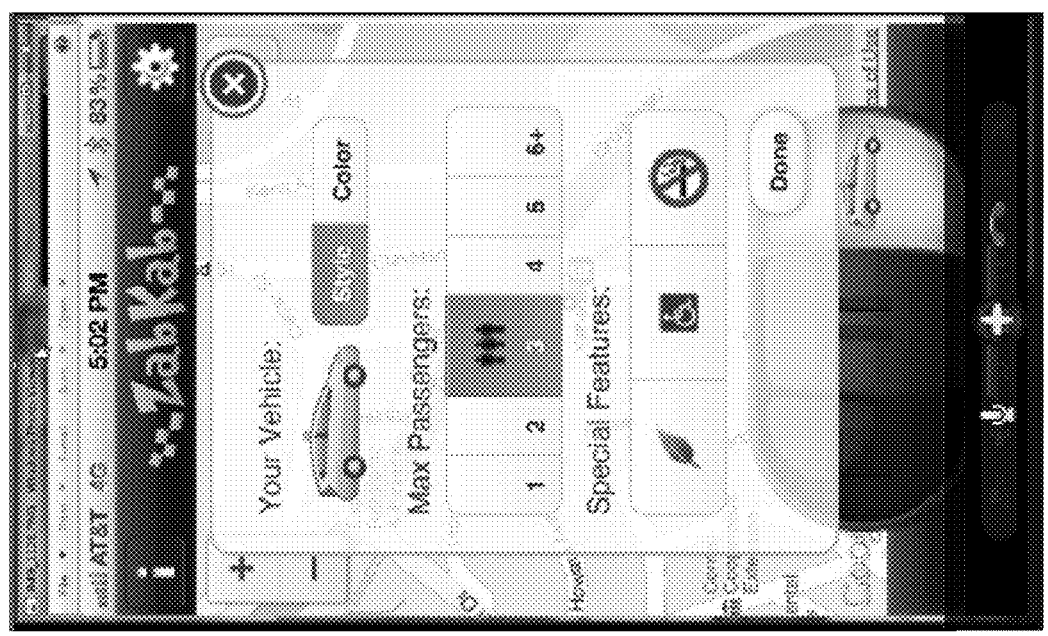

A person using a virtual hailing function in accordance with the present application can also send information from other "buttons" via an interface provided in a display screen such as indicating how many people are in their party (requiring a larger type of taxi) or whether a wheelchair accessible taxi in needed. Other preferences can also be indicated such as the desire for a more environmentally friendly taxi vehicle type (e.g. hybrid, electric, etc). (see, for example, FIGS. 8-10). These optional preferences or requests are sent to drivers along with, or integrated with, the hailing icon. This provides the ability to identify a need, for example, for a wheelchair accessible taxi to only taxis that are wheelchair accessible by filtering the unique requests of a person to only the taxi drivers that supports his/her show request.

Moreover, the present application provides for a virtual hail from people to drivers in a pre-defined geographic area (e.g. 5 block radius) that is configurable and/or customizable by the user. As noted below, a driver has the ability, for example, to zoom in or out to see a wider or narrower field of people hailing. Furthermore, the present application broadly matches supply of taxis to demand of people needing a taxi. On both a micro-basis (e.g., one or a few taxis and one or a few passengers) and a macro-basis (e.g., many taxis and many passengers), the present application brings such supply and demand into a previously unrealized equilibrium. For example, if an event lets out and 100 individual people hail for a taxi using mobile computing devices in accordance with the present application, but only ten taxis are within a 5 block range to see such hails on the default setting, the software logic "knows" that only ten taxis "see" the demand of 100 parties needing a taxi and will automatically extend the visual radius of taxis until at least 90 more unoccupied taxis see the hailing icons.

In addition to customizing an appearance of an icon, such as to indicate the type of vehicle, color (for different markets), capacity, smoking/non-smoking, capacity, or the like, a taxicab driver may also select one or more options that indicates to driver's status, for example on-duty, occupied, and off duty. This information is used to provide status to prospective passengers who activate their mobile computing devices in accordance with the present application. After electronically hailing for a taxi, a passenger sees a GPS map on the mobile computing device's display screen, an icon of a hailing person (representing the hailing person, referred to herein, as a "hailing icon") with the person's precise location and icons of taxis that are in the person's vicinity (a pre-defined geographic area). The status of the taxis and the aforementioned parameters are evident graphically (e.g. a person hailing can see the type of vehicle from its shape, color and disposition on the person's screen). To the passenger the images of the taxis on the mobile devices are for informational purposes only. In this way, passengers have visibility of taxis in their area, or coming into their area, and can visually see taxis that have decided to pick them up as they drive to their point of desired pick-up.

Thus, as set forth herein, in one or more implementations and in accordance with various contexts, the present application provides use for locating taxicabs, for locating passengers and for providing a way to gain the attention of a taxicab.

Referring now to the drawings, in which like reference numerals refer to like elements, FIG. 1 illustrates an example mobile computing device display screen in connection with a user attempting to hail a taxicab. In connection with locating taxicabs and in accordance with an implementation, the passenger transmits an instruction that he or she is looking for a taxicab by pressing a graphical screen control, such as hailer button 100 or other icon, on his or her mobile computing device. In the example shown in FIG. 1, the hailer button 100 is a graphical screen control illustrated as a circular button that includes a stick figure of a person raising an arm (i.e., a person trying to hail a cab). Once the button is pressed, a signal is sent out to drivers who are operating software implementing the teachings herein and who are looking for passengers that this passenger is looking for a taxicab. In addition, a graphical map is displayed on the user's mobile computing device that illustrates streets in near vicinity to the prospective passenger.

Figure 2:
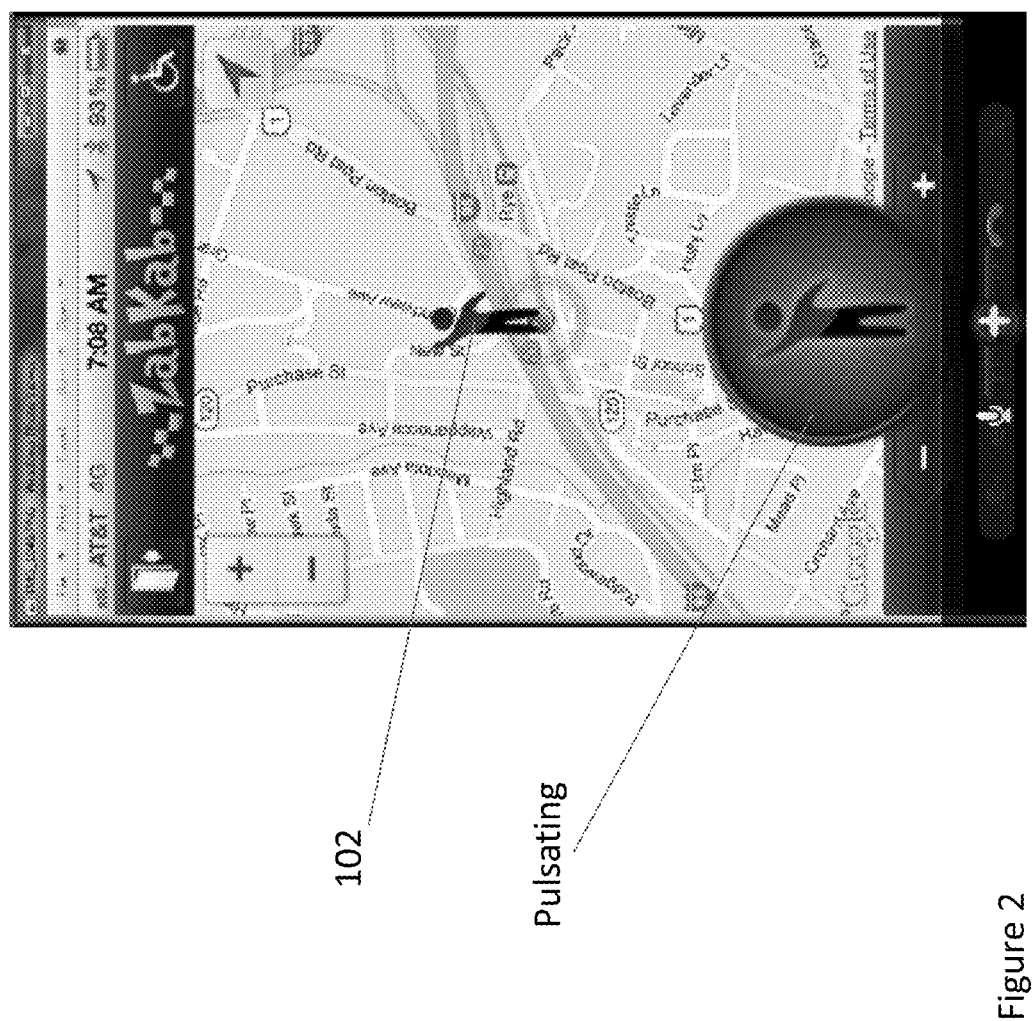

In addition to the graphical screen control 100 for hailing, hailer icon 102 is displayed that represents the person attempting to hail a taxicab, and represents how the person's icon appears to taxicabs operating mobile computing devices in accordance with the present application. Hailer icon 102 may appear in different configurations, such as a doorman of a building. In addition, hailer button 100 may appear as pulsating. This emulates a visual representation of sending out a hailing (or other) signal. Alternatively or in addition, one or more concentric circles may appear around hailer icon 102 (FIG. 2). By providing this interface for the prospective passenger, feedback is provided that the system is functioning and that the prospective passenger is broadcasting that he or she is seeking to hail a taxi.

Figure 3:
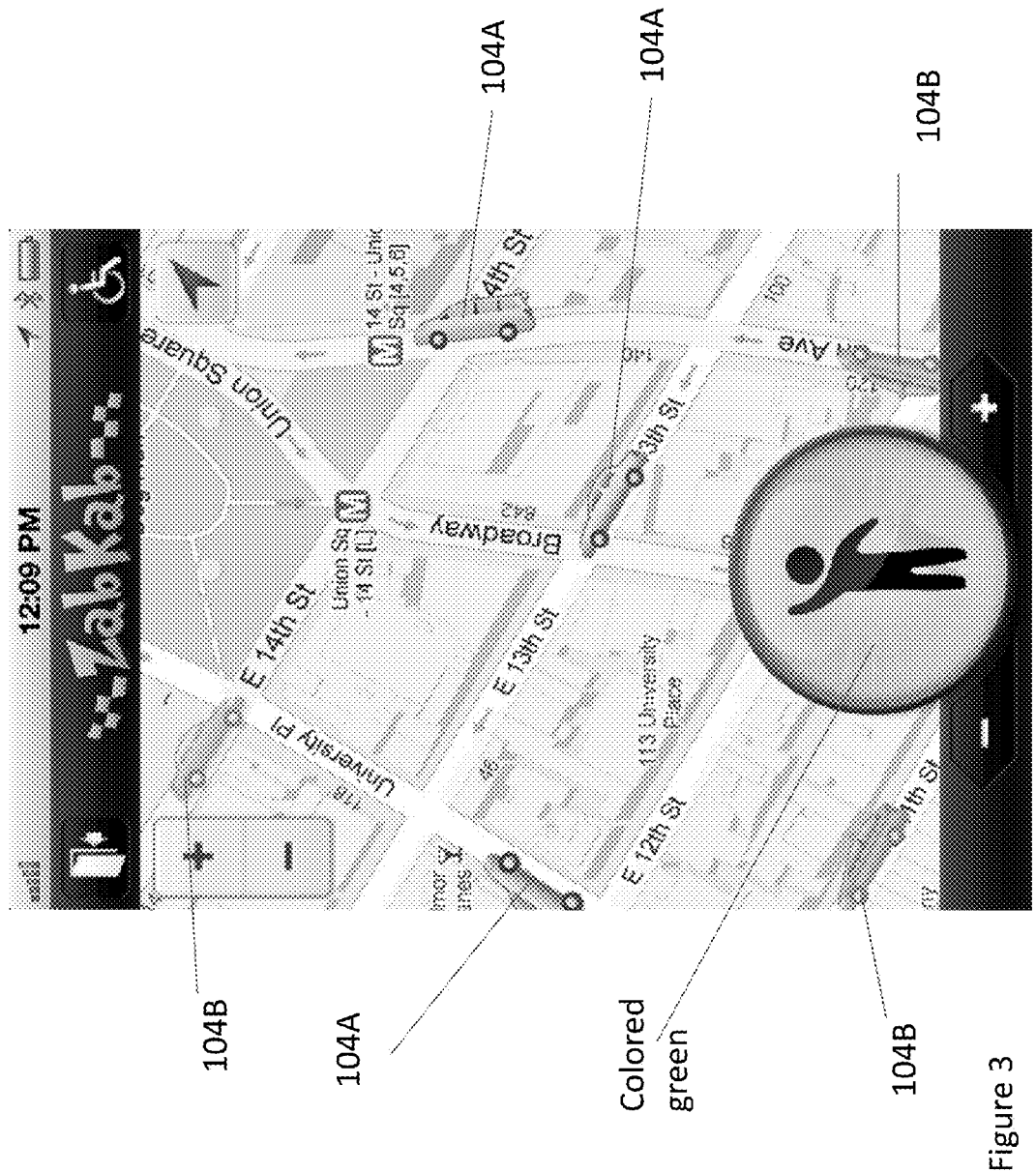

FIG. 3 illustrates an example mobile device display screen provided to a user attempting to hail a cab. In the example shown in FIG. 3, a map of surrounding streets is displayed and a plurality of taxicab icons 104 are positioned therein. Some of the cab icons 104A are represented as available (not grayed out) and some of the taxicab icons 104B are illustrated as unavailable (grayed out), for example, due to being off duty or already servicing a fare. By providing cab icons 104A, a user is informed that there are taxicabs that are on duty and in close proximity to the prospective passenger.

Figure 4:
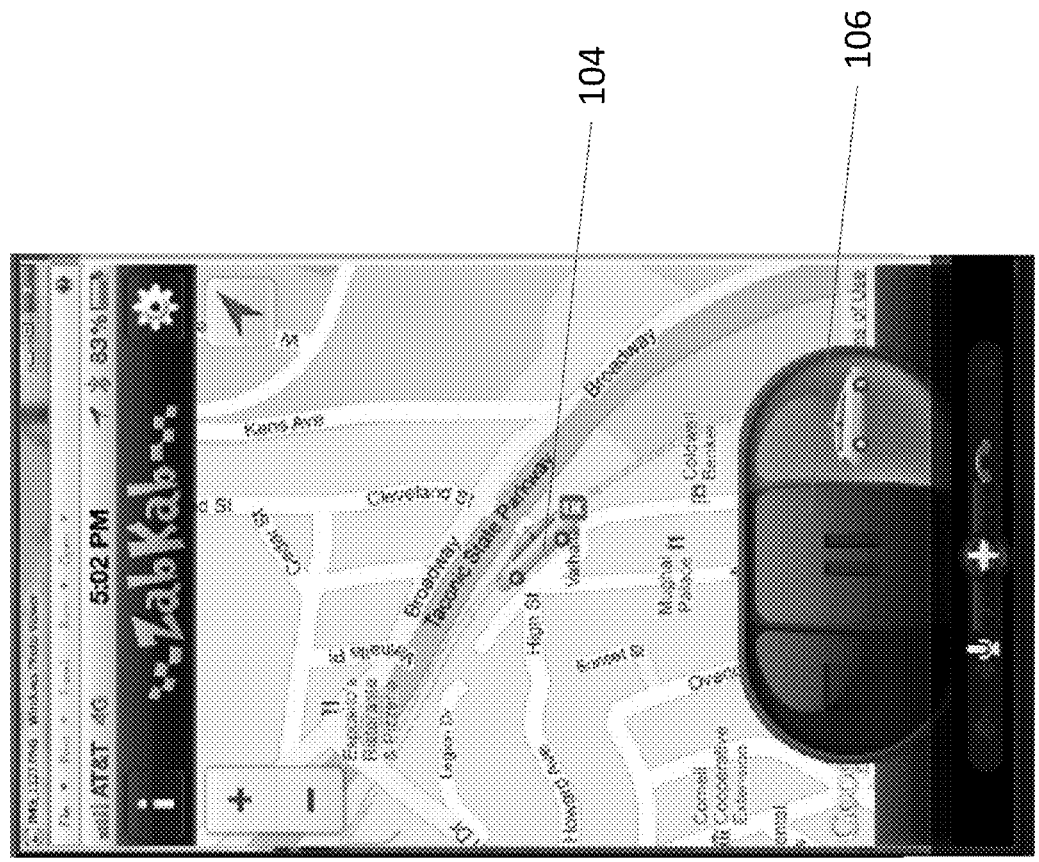
FIGS. 4-6 illustrates an example mobile device display screen presented to taxicab drivers operating software in accordance with an embodiment.

FIG. 4 illustrates an example mobile device display screen presented to taxicab drivers operating software in accordance with the teachings herein. Similar to hail button 100, taxicab drivers may be provided with find fares button 106. Once the button 106 is pressed, a signal is sent out to passengers who are operating software implementing the teachings herein and who are looking for taxicabs, that this taxicab is available and its location. As shown in FIG. 4, taxicab icon 104 is provided centered in the display to indicate to the taxicab driver that the system is working and that the taxicab is displayed to prospective passengers as unoccupied and available for a fare.

Figure 5:
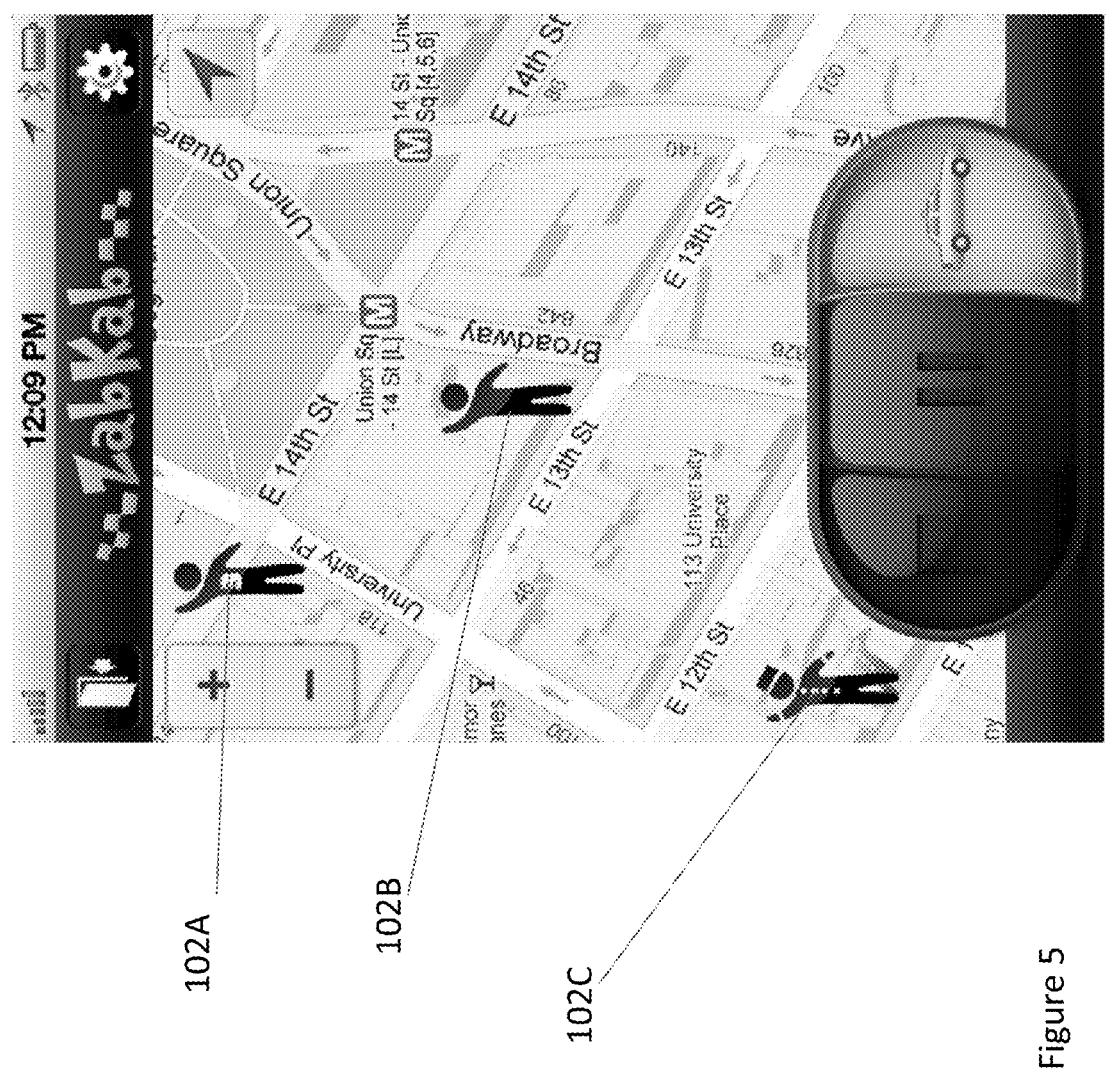

Referring now to FIG. 5, a plurality of hailer icons 102 are displayed for taxicab drivers to indicate prospective fares and their respective locations. In the example shown in FIG. 5, hailer icon 102A represents that 3 passengers are waiting for a taxicab, 102B represents that a single passenger is trying to hail a taxicab, and 102C represents a doorman hailing a taxicab on behalf of someone else. Thus, and as shown in FIG. 5, taxicab drivers can identify at a glance that a doorman of a building is trying to hail a cab for, for example, a resident or guest at a hotel. Hailer icons 102 may be selected as a function of customized profile data submitted by users while setting up software operating in accordance with the teachings herein. Thus, the present application provides for identifying different categories of people who are trying to hail a taxicab.

Figure 6:
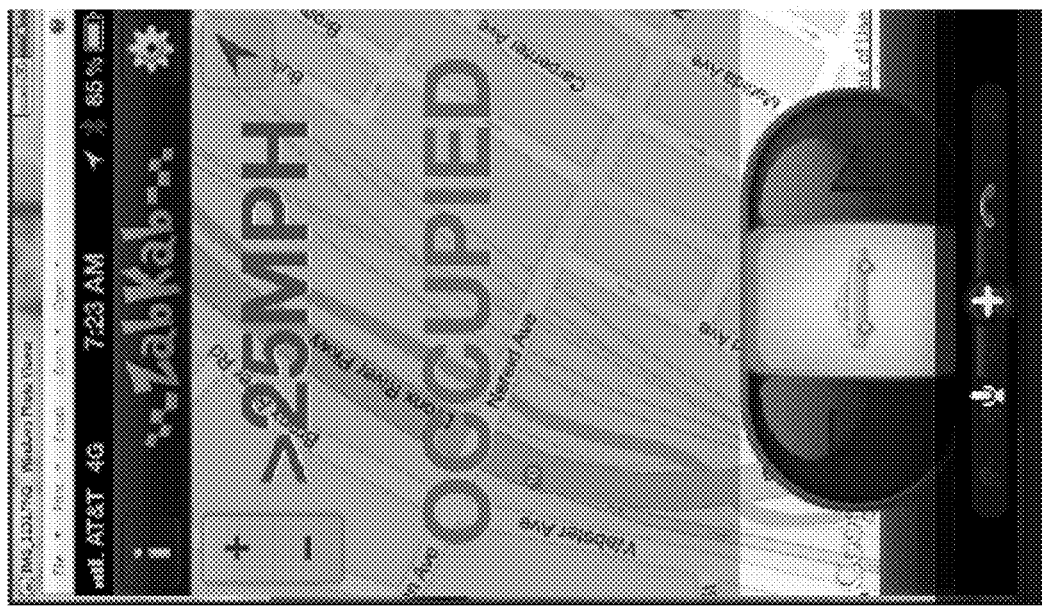

In order to maintain safety in connection with the present application, taxicab drivers may be restricted from interacting with software in accordance with the teachings herein while driving, although the software continues to operate. In one embodiment, software executes in the "background" of a mobile computing device and searches for prospective passengers substantially as described herein. Upon a determination that a prospective passenger is within close range of a taxicab, an audible response such as a beep is provided on the taxicab driver's mobile computing device thereby alerting the driver to check his or her device for a prospective passenger at a safe and convenient time. In one implementation, after a passenger as been picked up by a taxicab, the taxicab driver sets his or her mobile computing device to operate in an "occupied" mode, representing that the taxicab driver has a fare, and instructing his or her device not to seek out new passengers and to alert prospective passengers that the taxicab is unavailable. See for example, FIG. 6. One motivation for setting the device to "occupied" mode is to prevent audible alerts while servicing a fare.

Moreover and in an implementation, once a taxicab travels at a predefined speed, an option may be set to disable use of the application (for example, by graying out options) to preclude use of the application at high speeds. (See FIG. 6).

Figure 7:
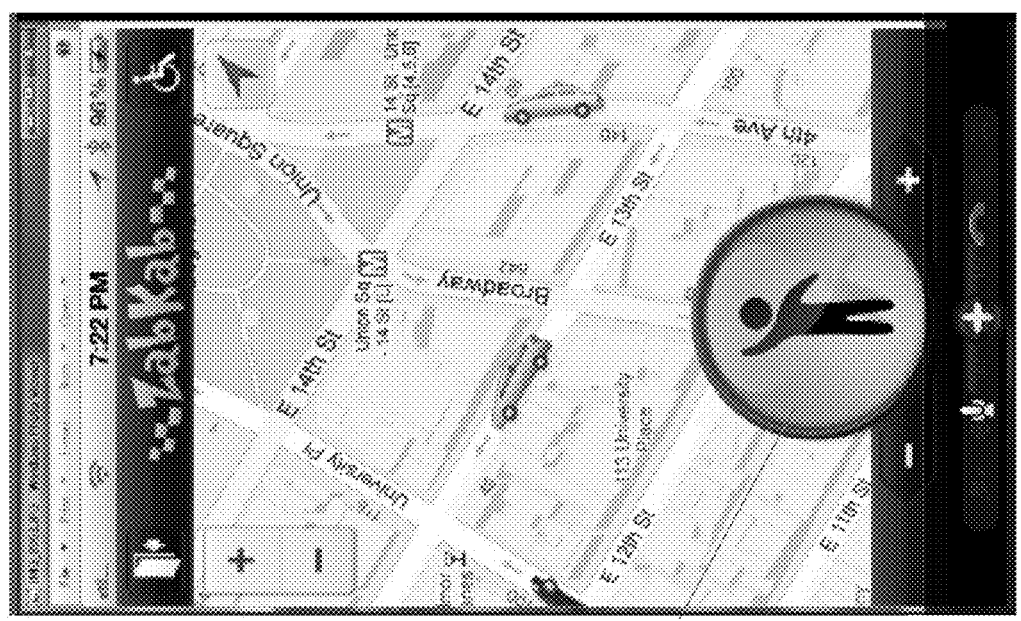
FIG. 7 illustrates an example of automatically changing a prospective passenger's status after the passenger is in a vehicle and traveling at a certain speed, in accordance with an embodiment.

In order to maintain a high level of accuracy, the present application may automatically indicate that a passenger has successfully hailed a cab and is in transit. A taxicab driver who is in pursuit of a prospective passenger would not want to continue such pursuit if the passenger is picked up by a different taxicab. Accordingly and in an implementation, the present application provides for automatically changing a prospective passenger's status after the passenger is in a vehicle and traveling at a certain speed, such as 5 mph. See, for example, FIG. 7.

For example, a passenger is trying to hail a taxicab in accordance with the present application. The passenger selects hailing button 100, and the passenger appears a taxicab driver's display of the driver's mobile computing device in accordance with the present application. Before the taxicab driver reaches the passenger, however, the passenger finds a different taxicab and leaves. Using GPS or other suitable technology, the present application determines that the passenger is traveling faster than a predetermined minimum speed (e.g. 5 mph) and automatically changes the passenger's status to that of being serviced, and removes the icon of the passenger from the taxicab driver's display. The taxicab driver, thereafter, pursues another passenger that is displayed in his or her mobile computing device display screen. In this way, updated information is provided for taxicab drivers and drivers are precluded from wasting valuable time trying to locate passengers who have already hailed cabs.

In an implementation, details regarding a prospective passenger's whereabouts and location may be obtained, processed and provided as a function of GPS technology. Many mobile computing devices, such as smart phones, PDAs, tablet computers or the like, are configured with GPS technology. When a user selects a hailer button 100, for example, GPS information about the user's location is substantially automatically accessed and used to position the user on the map that is presented on the user's mobile device, as well as to identify the user to taxicab drivers. Occasionally, GPS provided information is inaccurate, such as due to signal obstructions caused by tall buildings, trees or other objects, and a user will notice that hailer icon 102 is positioned on the wrong street. In accordance with an implementation, hailer icon 102 may be positioned manually by the user, such as using drag-and-drop technology, to place the hailer icon in the correct location, or other preferred location.

Moreover and in accordance with the present application, user location information is updated as a user is in the process of hailing a taxicab. Using GPS technology, for example, a user's specific whereabouts can be tracked as the user walks from street to street while trying to hail a cab. As the user's location information is updated, the user's icon positioned in the map that is displayed on the user's mobile computing device changes to the user's new respective location in the map.

In accordance with the present application, other customizable options are provided for the user's convenience. For example, options are provided for the user to zoom in or out of the view that is currently provided on the user's mobile computing device. For example, as shown in FIG. 3, the user may select a view that shows approximately ten streets that are in close proximity to the user. By zooming out, for example as shown in FIG. 2, the user may select a view that increases the number of streets in close proximity. By zooming out, the user may be able to identify more potentially available taxicabs in the user's vicinity that may be available for pickup. In one implementation, an interface may be provided that enables a user to define a zooming level by drawing a square on the display of his or her mobile computing device. For example, the display may show a map of 25 streets and by drawing a small square around two or three of those streets, the user effectively zooms in and views just those two or three streets in the display of his or her mobile computing device. As described herein, providing various views such as via a zoom-in or zoom-out of displays, may impact the amount of processing performed on the user's mobile computing device and/or a remote server device. This may be due to, for example, a need to track more taxicabs provided in a "zoomed-out" view of thirty streets, or fewer taxicabs provided in a "zoomed-in" view of five streets. By tracking fewer vehicles, processing requirements are reduced.

Further, the present application provides control for adjusting the amount of information displayed, such as vehicles, prospective passengers or the like, in accordance with various criteria. Such criteria include, but are not limited to, performance, readability, usability, aesthetics or the like.

Figure 11:
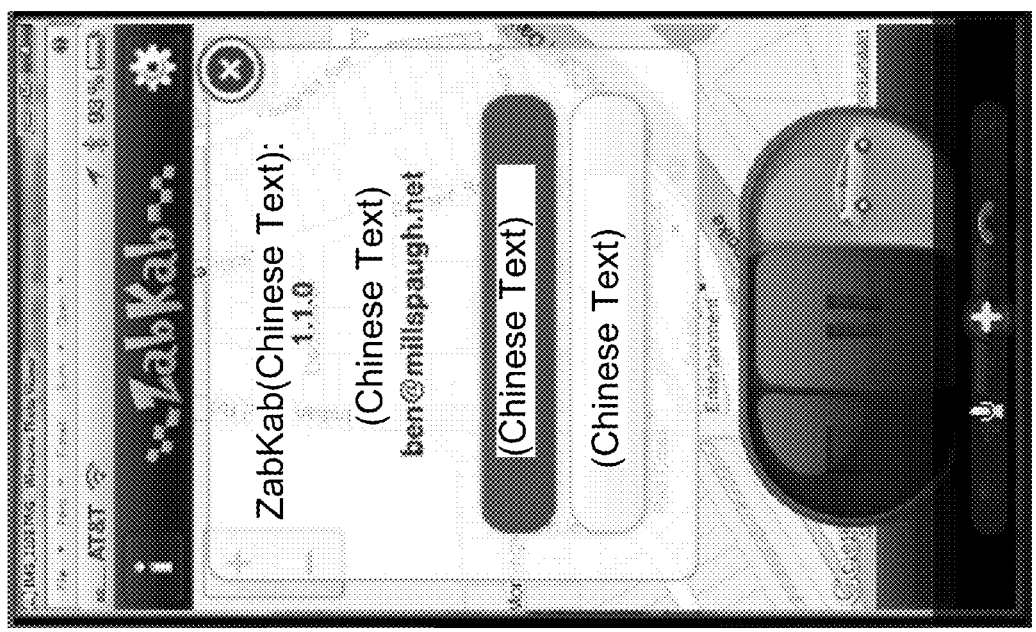
FIG. 11 illustrates an example foreign language implementation in accordance with the present application.

Moreover, the present application supports a plurality of written and spoken languages. FIG. 11 illustrates an implementation of the present application set forth in Japanese.

Figure 12:
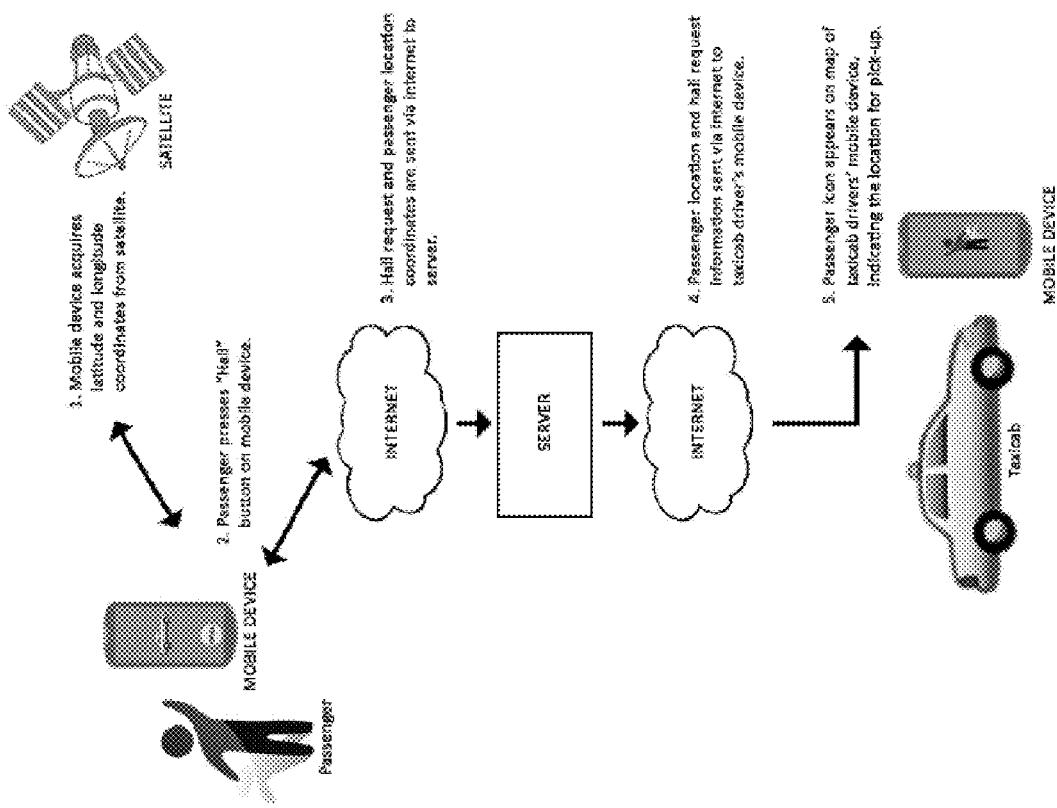
FIG. 12 is a block diagram illustrating steps associated with hailing a taxi cab and finding a fare in accordance with an implementation of the present application.

FIG. 12 illustrates a block diagram and includes example steps associated with hailing a cab and finding a fare in accordance with the present application. At step 1, a mobile computing device acquires location coordinates (such as latitude and longitude) from one or more satellites. At step 2, a passenger using the mobile computing device presses hail button 100, and at step 3 a request for a hail and passenger location coordinates are transmitted via the Internet to a central computing device, such as a web server. At step 4, a passenger's location and hail request information is transmitted via the Internet to the taxicab driver's mobile computing device. At step 5, a passenger icon appears on the map of a taxicab driver's mobile computing device, indicating the location for pickup of the passenger.

As such as noted above, taxicab drivers will operate software in accordance with the teachings herein are provided with information regarding prospective passengers and fares the drivers would otherwise not be aware of. Prospective passengers are illustrated substantially in real-time for drivers to locate. Unlike known dispatch systems, the present application portrays prospective passengers anonymously. In an embodiment, drivers are unaware and are not informed of the identity of any particular prospective passenger.

Many of the respective options provided herein serve to reduce resource requirements of the taxicab driver's computing device, including battery and processing power. Moreover, by operating in the background, taxicab drivers can use their mobile computing devices in other ways, such as for making telephone calls and texting, while their devices continue to search for prospective passengers.

In an embodiment, push technology, as known in the art, may be integrated in accordance with the teachings herein to notify taxicab drivers of prospective passengers. For example, taxicab drivers may be notified in accordance with the present application that a major event, such as a sports game, concert, or other large gathering, will soon end or has just recently ended. Taxicab drivers can use the information to position their vehicles near to the event and increase their chances for fares. Moreover, push technology may be useful in connection with controlling a screen display of a taxicab driver's mobile computing device. For example, a taxicab driver may have adjusted the display screen to zoom in on a map display to view five streets in close proximity. As a large football game is about to end, the driver's display automatically zooms out to display and alert the driver of the venue of the football game. Additional information may be provided, such as a flashing message that the football game is scheduled to end in 15 minutes, thereby providing the driver with ample time to relocate over to the game. Furthermore, other techniques may be used for controlling the map view for a taxicab driver, such as to re-center a map view with respect to a taxicab's current location, in case the driver repositions the map view (e.g., by dragging the view or engaging in other gestures).

Further, various forms of alerts may be automatically generated and transmitted in accordance with the present application. Examples of such alerts include traffic-related alerts, weather-related alerts and various emergency-related alerts.

In one implementation, the present application uses regular and periodic polling for information associated with prospective passengers and taxicabs. For example, every tenth of a second, half a second, second, 3 seconds, or virtually any configurable quantity, the mobile computing device polls a server computing device for information. Examples include polling for location information, and other information associated with a respective icon as shown and described herein. The received information may be used to display taxicab, passenger and other information on mobile computing devices. As information is received representing changes in location, status or the like, images displayed on the mobile computing devices may change. For example, a taxicab may be located at Fifth Avenue and 47th St. in New York City. As the taxicab travels to 45th St., updated information is received and the display is redrawn to position the taxicab at 45th St. In an implementation, the taxicab is this provided such that it appears to move down fifth Avenue to 45th St. this provides an aesthetically pleasing interface that appears to represent vehicles moving.

In an implementation, open connectivity is provided, for example, via web sockets. Unlike polling, which receives information once and disconnects, web sockets maintains an active communication session, such as by establishing a virtual tunnel between the client device and a server device, which enables reception of much more information and more efficiently. By maintaining an open communication session, a prospective passenger's whereabouts can be easily tracked and provided for taxicab drivers over time.

A significant amount of computing processing occurs in accordance with the present application substantially real time. Moreover a plurality of information types is regularly and frequently received and used in complex calculations to provide the information and graphical screen displays shown and described herein. For example, geospatial information representing longitude, latitude, altitude, speed and the radius of the earth are examples of information types used to determine taxicab and prospective passenger information.

Thus, the present application provides new and convenient way for prospective passengers to locate available taxicabs, and for taxicabs to locate passengers. In one implementation, a matching process may be provided such that when a prospective passenger seeks a taxicab, that passenger is paired to a specific taxicab. The passenger's hailer icon 102 may appear grayed out for all other taxicabs operating mobile computing devices in accordance with the present application. The passenger may be free to accept any taxicab that passenger may see before the one paired taxicab arrives. Referred to therein, generally, as a "long hail," it is envisioned herein that selective matching of a passenger to a taxicab in accordance with the present application will increase the likelihood of taxicabs realizing fares.

Thus, as shown and described herein, the present application regards a system and method for efficiently assisting a taxicab driver to locate and find people seeking a taxi, and similarly for passengers to locate and find a taxicab, in accordance with an anonymous, spontaneous, hailing transaction (pick-up). Although present invention has been described in relation to particular embodiments thereof, many other variations and modifications and other uses will become apparent to those skilled in the art. For example, the present application is useful in any market where potential passengers desire transportation without prearranged pickup or dispatch. Therefore, the application is not limited to particular locations, such as of New York City, but is applicable in many geographic and physical locations. Moreover, the present application is useful and can coexist in geographic locations that support prearranged pickup and dispatch.

For example, the present application may configure mobile computing devices to operate as a sort of virtual hailing devices. Operating in response to native functionality, such as an accelerometer provided with some smart devices, upon being raised quickly or turned sideways, the mobile computing device may begin flashing brightly and possibly including an icon or other graphical elements representing that the person is seeking to hail a cab. Thus, in addition to providing graphical map displays of prospective passengers and taxicab drivers, present application may further operate as a virtual hailer. It is preferred, therefore, that the present invention not be limited by the specific disclosure herein.

What is claimed:

1. A system that uses information received from a plurality of computing devices that are associated with at least one of a person and a plurality of vehicles, each respectively providing accurate location-based information representing a respective location of each of the plurality of computing devices, to enable the person to send a substantially anonymous hail on a communication network to the plurality of vehicles within a geographic area relative to a location of the person, the system comprising:

at least one processor that is configured to execute instructions provided on non-transitory computer-readable media, in order to perform operations that include:
configuring a computing device that is associated with the person with a hailing application, wherein the computing device that is associated with the person is configured using the hailing application to present a graphical user interface, to obtain location-based information associated with a location of the computing device that is associated with the person, and to transmit, to the at least one processor on the communication network, the substantially anonymous hail comprising the location-based information associated with the computing device that is associated with the person;
receiving, on the communication network and from the computing device that is associated with the person, the substantially anonymous hail;
receiving on the communication network, from each of the plurality of computing devices associated with the plurality of vehicles and configured with a vehicle application, location-based information associated with each of the plurality of vehicles;
processing the received substantially anonymous hail and the location-based information associated with the plurality of vehicles to determine that at least one of the plurality of the vehicles is within a geographic vicinity of the person; and
transmitting over the communication network to the computing device that is associated with the person, information associated with a respective location of each of the at least one of the plurality of vehicles;
wherein the at least one processor ceases transmitting over the communication network the information associated with the respective location of each of the at least one of the plurality of vehicles after the computing device that is associated with the person travels above a predetermined speed.

2. The system of claim 1, wherein the graphical user interface operating on the computing device that is associated with the person includes selectable options for the person to identify an icon that represents information that is associated with the person.

3. The system of claim 2, wherein the identified icon represents at least one of a doorman, a bellhop, a number of people, and special needs.

4. The system of claim 2, wherein the at least one processor is further configured to receive and process information associated with the identified icon to determine the at least one of the plurality of the vehicles.

5. The system of claim 1, wherein the graphical user interface operating on the computing device that is associated with the person provides at least one option for a vehicle request.

6. The system of claim 1, wherein the information associated with a respective location of each of the at least one of the plurality of vehicles is usable by the graphical user interface to identify in a map where the at least one of the plurality of vehicles is located.

7. The system of claim 6, wherein the graphical user interface operating on the computing device that is associated with the person provides for zooming in and out of the map to locate fewer or more vehicles.

8. The system of claim 1, wherein the graphical user interface operating on the computing device that is associated with the person provides updated information automatically that represents a change in at least one vehicle's status.

9. The system of claim 8, wherein the updated representation is illustrated in the graphical user interface operating on the computing device associated with person, and represents a respective vehicle's location substantially in real time.

10. The system of claim 1, wherein the graphical user interface operating on the computing device that is associated with the person further provides information representing a vehicle or at least one person associated with a vehicle.

11. The system of claim 1, wherein the graphical user interface operating on the computing device that is associated with the person provides an alert.

12. The system of claim 1, wherein the at least one processor is further configured to display an updated representation of a new respective location of the at least one of the plurality of vehicles as the at least one of the plurality of vehicles moves.

13. The system of claim 1, wherein information associated with a location of each of the at least one of the plurality of vehicles is provided via the graphical user interface operating on the computing device that is associated with the person.

14. The system of claim 1, wherein the graphical user interface operating on the computing device that is associated with the person provides for selecting a different location, and wherein the computing device that is associated with the person is further configured using the hailing application to transmit, to the at least one processor on the communication network, different location-based information associated with the selected different location.

15. A method that uses information received from a plurality of computing devices that are associated with at least one of a person and a plurality of vehicles, each respectively providing accurate location-based information representing a respective location of each of the plurality of computing devices, to enable the person to send a substantially anonymous hail on a communication network to the plurality of vehicles within a geographic area relative to a location of the person, the method comprising:
providing, on a computing device that is associated with the person, a hailing application, wherein the computing device that is associated with the person is configured using the hailing application to present a graphical user interface, to obtain location-based information associated with a location of the computing device that is associated with the person, and to transmit, to at least one processor on the communication network, the substantially anonymous hail comprising the location-based information associated with the computing device that is associated with the person;
receiving, by the at least one processor on the communication network and from the computing device that is associated with the person, the substantially anonymous hail;
receiving, by the at least one processor on the communication network, from each of the plurality of computing devices that are associated with the plurality of vehicles and configured with a vehicle application, location-based information associated with each of the plurality of vehicles;
processing, by the at least one processor, the received substantially anonymous hail and the location-based information associated with the plurality of vehicles to determine that at least one of the plurality of the vehicles is within a geographic vicinity of the person; and transmitting, by the at least one processor over the communication network to the computing device that is associated with the person, information associated with a respective location of each of the at least one of the plurality of vehicles;
wherein the at least one processor ceases transmitting over the communication network the information associated with the respective location of each of the at least one of the plurality of vehicles after the computing device that is associated with the person travels above a predetermined speed.

16. The method of claim 15, further comprising providing, via the graphical user interface operating on the computing device that is associated with the person, selectable options for the person to identify an icon that represents information that is associated with the person.

17. The method of claim 16, wherein the identified icon represents at least one of a doorman, a bellhop, a number of people, and special needs.

18. The method of claim 16, further comprising receiving and processing, by the at least one processor, information associated with the identified icon to determine the at least one of the plurality of the vehicles.

19. The method of claim 15, further comprising providing, via the graphical user interface operating on the computing device that is associated with the person, at least one option for a vehicle request.

20. The method of claim 15, wherein the information associated with a respective location of each of the at least one of the plurality of vehicles is usable by the graphical user interface to identify in a map where the at least one of the plurality of vehicles is located.

21. The method of claim 20, further comprising providing, via the graphical user interface operating on the computing device that is associated with the person, functionality for zooming in and out of the map to locate fewer or more vehicles.

22. The method of claim 15, further comprising providing, via the graphical user interface operating on the computing device that is associated with the person, updated information automatically that represents a change in at least one vehicle's status.

23. The method of claim 22, wherein the updated representation is illustrated in the graphical user interface operating on the computing device associated with person, and represents a respective vehicle's location substantially in real time.

24. The method of claim 15, further comprising providing, via the graphical user interface operating on the computing device that is associated with the person, information representing a vehicle or at least one person associated with a vehicle.

25. The method of claim 15, further comprising providing, via the graphical user interface operating on the computing device that is associated with the person, an alert.

26. The method of claim 15, further comprising displaying, via the graphical user interface operating on the computing device that is associated with the person, an updated representation of a new respective location of the at least one of the plurality of vehicles as the at least one of the plurality of vehicles moves.

27. The method of claim 15, wherein information associated with a location of each of the at least one of the plurality of vehicles is provided via the graphical user interface operating on the computing device that is associated with the person.

28. The method of claim 15, wherein the graphical user interface operating on the computing device that is associated with the person provides for selecting a different location, and wherein the computing device that is associated with the person is further configured using the hailing application to transmit, to the at least one processor on the communication network, different location-based information associated with the selected different location.

\* \* \* \* \*